US007916065B1

(12) United States Patent
Mintz et al.

(10) Patent No.: US 7,916,065 B1
(45) Date of Patent: Mar. 29, 2011

(54) COUNTERMEASURE SYSTEM AND METHOD USING QUANTUM DOTS

(75) Inventors: Nathan Mintz, Redondo Beach, CA (US); Mark Skidmore, Long Beach, CA (US); Kalin Spariosu, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 228 days.

(21) Appl. No.: 12/334,148

(22) Filed: Dec. 12, 2008

(51) Int. Cl.
*G01S 7/36* (2006.01)
(52) U.S. Cl. ............................................ 342/13; 342/14
(58) Field of Classification Search .................. 342/5–20
See application file for complete search history.

(56) References Cited

U.S. PATENT DOCUMENTS

| | | | |
|---|---|---|---|
| 5,345,238 A * | 9/1994 | Eldridge et al. ................... | 342/3 |
| 5,505,928 A | 4/1996 | Alivisatos et al. | |
| 6,178,865 B1 | 1/2001 | Roberts | |
| 6,322,901 B1 | 11/2001 | Bawendi et al. | |
| 6,338,292 B1 | 1/2002 | Reynolds et al. | |
| 6,344,272 B1 | 2/2002 | Oldenburg et al. | |
| 6,501,091 B1 | 12/2002 | Bawendi et al. | |
| 2005/0001755 A1* | 1/2005 | Steadman et al. .............. | 342/14 |
| 2005/0150371 A1* | 7/2005 | Rickard ......................... | 89/1.11 |
| 2006/0068154 A1 | 3/2006 | Parce et al. | |
| 2007/0034774 A1 | 2/2007 | Blake | |
| 2007/0242713 A1 | 10/2007 | Spariosu et al. | |
| 2007/0257831 A1* | 11/2007 | Mathews et al. ................. | 342/22 |
| 2008/0178924 A1* | 7/2008 | Kempa et al. .................. | 136/244 |

OTHER PUBLICATIONS

J. Muller, et al. "Monitoring surface charge migration in the spectral dynamics of single CdSe/CdS nanodot/nanorod heterostructures," Physical Review, The American Physical Society, 2005, B 72, pp. 205339-1 to 205339-12.

Robert M. Kraus, et al., "Interplay between Auger and Ionization Processes in Nanocrystal Quantum Dots," The Journal of Physical Chemistry B Letters, 2005, 109, published on the Web Sep. 14, 2005, pp. 18214-18217.

R.A.M. Hikmet, et al., "Study of conduction mechanism and electroluminescence in CdSe/ZnS quantum dot composites," Journal of Applied Physics, vol. 93, No. 6, Mar. 15, 2003, pp. 3509-3514.

K. I. Rusakov, et al., "Control of Efficiency of Photon Energy Up-Conversion in CdSe/ZnS Quantum Dots," Optics and Spectroscopy, vol. 94, No. 6, 2003, pp. 859-863.

H. Borchert, et al., "High resolution photoemission study of CdSe and CdSe/ZnS core-shall nanocrystals," Journal of Chemical Physics, vol. 119, No. 3, Jul. 15, 2003, pp. 1800-1807.

William E. Buhro, et al., "Semiconductor Nanocrystals: Shape matters," Nature Materials, Nature Publishing Group, vol. 2, Mar. 2003, pp. 138-139.

None, "Sizing Curve of CdSe Nanocrystals," chart, NN-Labs, LLC, http://www.nn-labs.com/cdsesizintcurve.html, downloaded Dec. 12, 2008. L. E. Brus, et al., "Nanocrystals and nano-optics," Phil. Trans., R. Soc. Lond., A, vol. 353, 1995, pp. 313-321.

Steve V. Kershaw, et al., Development of IR-Emitting Colloidal II-VI Quantum-Dot Materials, IEEE Journal of Sleected Topics in Quantum Electronics, vol. 6, No. 3, May/Jun. 2000, pp. 534-543.

\* cited by examiner

*Primary Examiner* — Thomas H Tarcza
*Assistant Examiner* — Timothy A Brainard
(74) *Attorney, Agent, or Firm* — Pillsbury Winthrop Shaw Pittman LLP (57) ABSTRACT

In one embodiment, a countermeasure system for protecting an asset from a missile attack includes a decoy comprising a plurality of quantum dots selected to emit radiation having a radiation emission profile similar to a profile of a radiation signature of the asset. In another embodiment, a method of simulating a radiation signature of an asset using quantum dots includes dispersing quantum dots to form a cloud of quantum dots; and exciting the quantum dots with a first radiation so that the quantum dots emit a second radiation having a profile similar to the radiation signature profile of the asset.

21 Claims, 5 Drawing Sheets

COUNTERMEASURE SYSTEM AND METHOD USING QUANTUM DOTS

BACKGROUND

This disclosure pertains to quantum dots, and particularly to a countermeasure system for protecting an asset from a missile attack using quantum dots and a method of simulating a radiation signature of an asset using quantum dots.

Assets such as satellites can be vulnerable to a missile attack. Hence, the need to protect such assets. Generally, missiles use various methods to track and seek their target. For example, missiles can seek the target by sensing the radiation (e.g., infrared) signature of the target such as the radiation emanating from the target (e.g., the heat of the target's engine).

Various methods for protecting such assets exist. For example, conventional deployable infrared (IR) countermeasures use pyrolytic materials, such as magnesium-viton-teflon (MVT), in the form of flares, to generate an intense blackbody signature by utilizing a highly exothermic reaction. The radiation emitted by the exothermic reaction peaks in the short, wavelength infrared (SWIR) range between about 1 µm and about 3 µm. The exothermic reaction serves to simulate or imitate the heat signature of the asset (e.g., heat from the blackbody emission of the satellite), thus fooling the heat seeking missile to target the origin of the exothermic reaction instead of the asset. This is considered the simplest form of active IR countermeasure (CM). Other mechanisms, such as pulse generators and lasers have also been used in trying to trick radiation seekers.

However, active countermeasures have numerous limitations in the space domain, due to target velocity, the extreme (between about 100 km and about 1000 km) standoff range of the asset and the anaerobic environment, which restricts the use of certain systems which rely upon oxygen to feed the exothermic reaction. Passive countermeasures also exist. However, passive countermeasures lack the ability to precisely replicate the spectral signature of the target.

Current countermeasure systems are inadequate to the task of spoofing an IR seeker's intent on targeting a near ambient temperature (e.g., about 300° K) target such as a spacecraft, which can have peak blackbody radiation intensities well into the long wavelength infrared (LWIR) range between about 8 µm and about 12 µm. Indeed, numerous methods exist for discriminating the targeted asset from current decoy technology. For example, an LWIR sensor is able to easily differentiate the targeted asset which emits radiation with peak intensities in the LWIR range from the decoy because the relatively small surface area decoy has a peak intensity outside of the LWIR band. Indeed, the decoy emits in the mid-wavelength infrared (MWIR) or short wavelength infrared (SWIR) ranges outside the long wavelength infrared (LWIR) range. Furthermore, the difference in intensity peaks between the radiation emitted by the decoy and the radiation emitted by the target can be used to differentiate between the decoy and the target by employing a two color sensor in the IR.

Countermeasures against intercontinental ballistic missiles (ICBMs) and intermediate-range ballistic missiles (IRBMs) have utilized inflatable balloons to try to spoof radar and IR seeker systems. Such balloons can be inflated to a size roughly comparable to that of the target they intend to protect. However, from an orbital standpoint, inflatable balloons may create a significant debris hazard, particularly if they are punctured by errant debris or otherwise if destroyed by the missile. Therefore, in general, existing countermeasures have had certain limitations.

SUMMARY

An embodiment of the present disclosure provides a countermeasure system for protecting an asset from a missile attack. The system includes, in one or more aspects, a decoy comprising a plurality of quantum dots, the quantum dots being selected to emit radiation having a radiation emission profile similar to an emission radiation profile of the asset.

Another embodiment of the present disclosure provides a method of simulating a radiation signature of an asset using quantum dots. The method includes, in one or more aspects, dispersing quantum dots to form a cloud of quantum dots; and exciting the quantum dots with a first radiation so that the quantum dots emit a second radiation having a profile similar to a profile of the radiation signature of the asset.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

A countermeasure system according to an embodiment of the present disclosure utilizes a decoy to trick a missile seeking an asset (e.g., a satellite) to seek the decoy instead of the asset. The decoy includes dispersed quantum dots. Quantum dots are nanostructures of semiconductor material between about 2 nm and about 80 nm in diameter. As the size (e.g., diameter) of a nanostructure approaches the Bohr exciton radius for an electron in the bulk material, the electronic properties of the material change. The density of states of the quantum dot changes, which has a number of unique effects. First, it causes a "blue shift" in a bandgap of the bulk material, causing the quantum dots to emit radiation at a shorter wavelength than the bulk material and causing the emitted radiation to occur at a very narrow characteristic wavelength. The bandgap energy of a quantum dot is highly size dependent. This feature allows tuning of the electro-optical properties of the quantum dots to specific wavelengths. The energy spectrum of a quantum dot can be controlled by controlling the geometrical size, shape, and the strength of the confinement potential.

Figure 1:
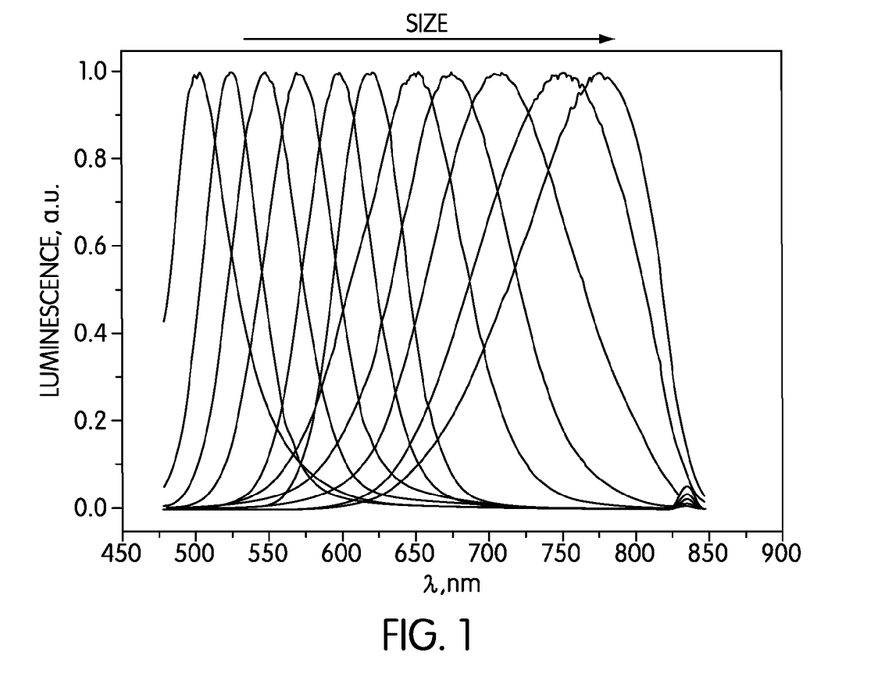
FIG. 1 is a plot of luminescence peaks of CdSe quantum dots as a function of wavelength for various sizes of the CdSe quantum dots.
Figure 2:
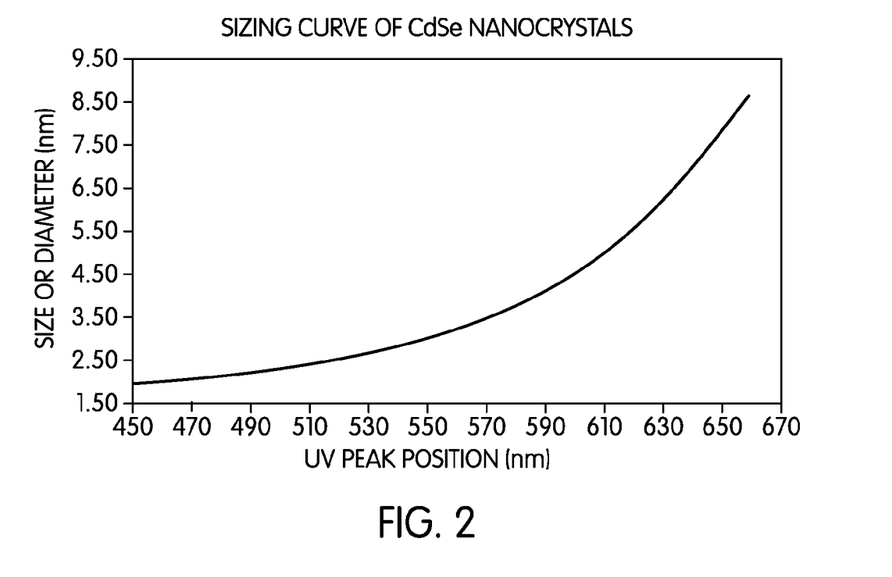
FIG. 2 is a plot showing the relationship between the wavelength of emitted radiation peak and the size (e.g., diameter) of the quantum dots.

FIG. 1 is a plot of luminescence peaks of CdSe quantum dots as a function of wavelength for various sizes of the CdSe quantum dots. As shown in FIG. 1, the larger the size of the quantum dots, the greater is the wavelength of the peak emitted light. FIG. 2 is a plot showing the relationship between the wavelength of emitted radiation peak and the size (e.g., diameter) of the quantum dots. As shown in FIG. 2, the wavelength of the emitted radiation peak increases with the increasing size (e.g., increasing diameter) of the quantum dots.

Figure 3:
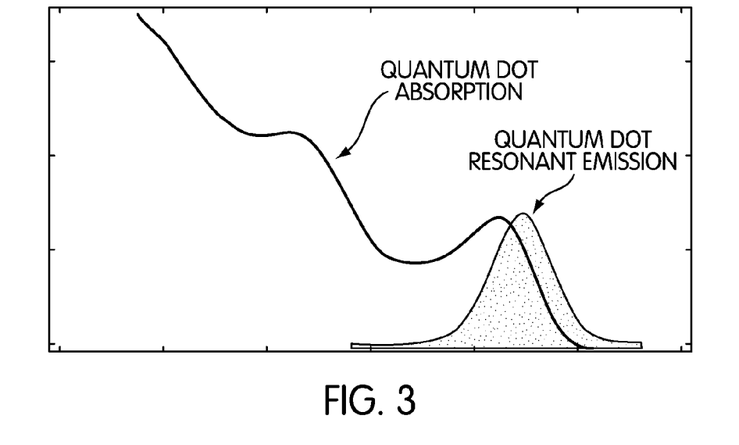
FIG. 3 depicts a theoretical broad range absorption spectrum of the quantum dots along with the narrow resonant emission characteristic of the quantum dots.

Quantum dots can absorb radiation from incident photons (excitation or pump source) having an energy equal or greater than a bandgap energy of the quantum dots. In other words, the excitation source has a wavelength shorter than or equal to the wavelength emitted by the quantum dots. Upon absorbing a photon, the quantum dots can reemit a photon (or under certain circumstances multiple photons) at the characteristic wavelength of the quantum dots. The characteristic wavelength of the quantum dots can be tuned by selecting a size of the quantum dots. FIG. 3 depicts a theoretical broad range absorption spectrum of the quantum dots along with the narrow resonant emission characteristic of the quantum dots. For example, for certain quantum dots, solar radiation can be used as the excitation or pump source. Therefore, the quantum dots act as a frequency downconverter for the solar energy into specific frequency ranges. The wavelength tunability of quantum dots is broad enough to allow a significant portion of visible and infrared to be exploited with a small number of different materials. Because each quantum dot has a certain defined carrier lifetime, each quantum dot has a defined saturation rate which results in the quantum dot having a defined unit of emitted radiation intensity.

As stated above, in one embodiment, broadband solar energy can be used to excite the quantum dots and induce emission in their characteristic wavelength. Alternatively or in addition, an artificial excitation or pump source can be provided to excite the quantum dots. For example, a laser can be used to excite the quantum dots to induce radiation emission at the characteristic wavelength of the quantum dots. Other mechanisms of excitation can include using a flash of radiation provided by an exothermic chemical reaction in the vicinity of the quantum dots, using radiation from an incandescent source or radiation from any other artificial source. For example, an artificial excitation or pump source of energy (e.g., a laser) can be used where solar radiation is not available.

Figure 4:
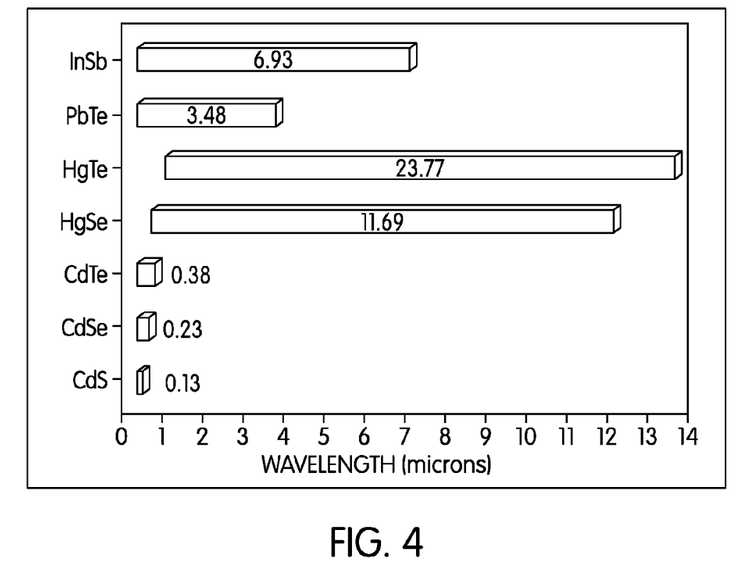
FIG. 4 shows a wavelength emission range of various quantum dot materials depending upon the size of the quantum dot.

FIG. 4 shows the emission range of various quantum dot materials (InSb, PbTe, HgTe, HgSe, CdTe, CdSe and CdS) depending upon the size of the quantum dot. The right end of each bar represents the emission peak of the corresponding bulk material. The left end of each bar represents the resonant emission peak for a 3 nm size quantum dot corresponding to the same bulk material. By using one or more of the quantum dot materials listed above, a specific emission wavelength range can be covered. For example, a specific mixture of quantum dot nanoparticles as well as the size of the quantum dots can be selected so as to cover a desired emission wavelength range. Alternatively or in addition, other composite semiconductor materials such as lead tin telluride (PbSnTe) can also be used to make the quantum dots.

Furthermore, since each individual quantum dots has a defined emission intensity and wavelength band, a mixture of quantum dots can be made with ratios of different sizes and types of materials to produce a characteristic emission profile over a broad portion of the spectrum. As a result, any blackbody radiation source along with hyperspectral signatures can be replicated.

Previous generation of disposable. IR countermeasures (flares used as decoys) relied on either the emission peaks of specific chemical agents or on the high level blackbody radiation of pyrophoric sources. However, as stated above these systems offer limited utility in a space environment since many consume oxygen in the reaction. Furthermore, since a high signal-to-noise ratio (SNR) is required to spoof a missile seeker, these systems are required to have a high temperature, shifting the intensity peak towards the visible. This make this type of countermeasure easily foiled by advanced sensors using two color filters or other means which discriminate between the hot decoy and the hot target against the backdrop of space.

Figure 5:
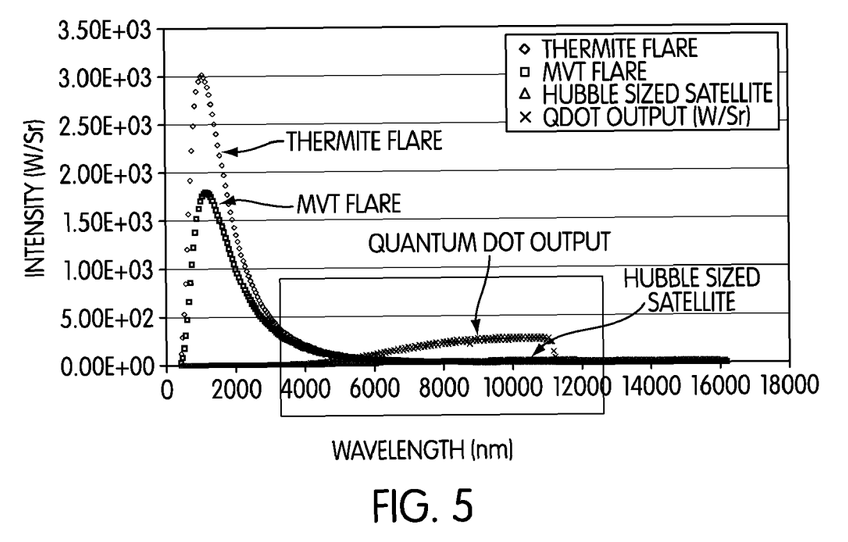
FIG. 5 shows comparative plots of intensity profiles versus wavelength of two types of hot flare counter measures, a blackbody radiation signature of a satellite and a radiation emission signature of a cloud of dispersed quantum dots, according to an embodiment of the present disclosure.
Figure 6:
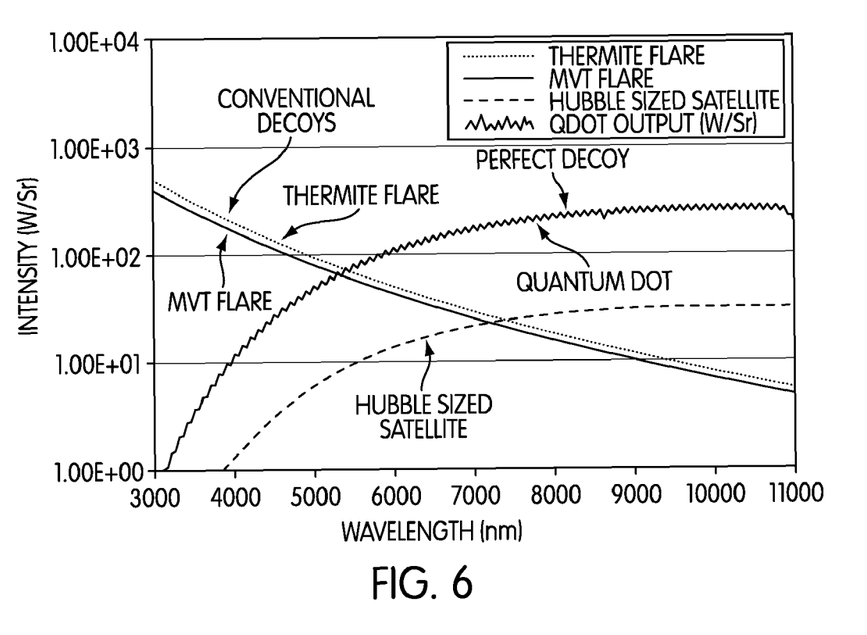
FIG. 6 shows an enlargement of a portion of the plots shown in FIG. 5 in the wavelength range between 3000 nm to 11000 nm.

FIG. 5 shows comparative plots of intensity profiles versus wavelength of two types of hot flare counter measures (Thermite, MVT), a blackbody radiation signature of a satellite the size of the Hubble space telescope and a radiation emission signature of a cloud of dispersed quantum dots designed to achieve a 10 to 1 signal-to-noise ratio over satellite. These plots are obtained through a simulation. FIG. 6 shows a zoom in of a portion of the plots surrounded by a rectangle in FIG. 5 (in the wavelength range between about 3000 nm and about 11000 nm). FIG. 6 shows plots of the intensity profile in the wavelength range from MWIR to 14 μm LWIR cutoff. The plots in FIG. 6 show the distinct difference in emission profiles between the satellite, conventional countermeasures and a quantum dot cloud. As shown in FIG. 6, the emission of the quantum dot cloud used as the decoy has generally the same profile as the satellite (the asset) in the wavelength range between about 3000 nm to about 11000 nm.

Figure 7:
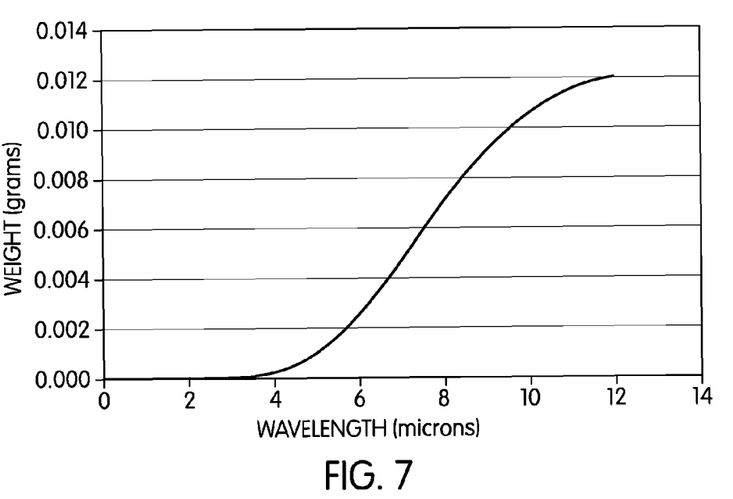
FIG. 7 is plot of the weight of quantum dots material as a function of desired emission wavelength needed to replicate a 1000:1 signal-to-noise ratio for a satellite having a the size of Hubble telescope, according to an embodiment of the present disclosure.

A quantum dot cloud may be able to simulate the radiation signature of a protected asset (e.g., satellite) by reproducing an accurate infrared spectrum that would have a general profile as the radiation emission profile of the protected asset. The amount of quantum dot material needed to achieve an adequate SNR (e.g., a SNR between about 10:1 and about 1000:1) is relatively small. For example, the amount of quantum dot material needed to achieve a SNR of 1000:1 to simulate a satellite having the size of the Hubble telescope is relatively small. FIG. 7 is plot of the weight of quantum dots material (in grams) as a function of desired emission wavelength required to replicate a 1000:1. SNR for a satellite having a size of Hubble telescope. For example, to obtain an emission peak centered around 8 μm with a SNR equal to 1000:1, it is sufficient to use 0.008 g (8 mg) of quantum dot material, with an appropriate dispersion of the quantum dots and when the quantum dots are properly excited with a pump source of radiation. As shown in FIG. 7, the greater the wavelength desired to replicate a radiation signature of the asset (satellite) the greater is the amount of quantum dot material that may be needed to achieve a same SNR.

Due to the relatively small amount that may be required to achieve a desired SNR, quantum dot material may be an effective solution for use in a decoy in a spatial environment. Indeed, when deployed in space, a small package of one kilogram or less can be very effective to protect valuable assets (e.g. satellites).

Various methods can be employed to disperse a small quantum dots pack so as to create a cloud with a size appropriate to create generally the same signature as the asset it is intended to protect. For example, in one embodiment, the quantum dots can be dispersed by exploding a small pack of the quantum dots suspended in an inert gas (e.g., argon, helium, etc.). In another embodiment, the quantum dots can be sprayed from a reservoir into open space. Yet, in another embodiment, in addition to quantum dots, the decoy may further include radar chaff and the quantum dots can be coated onto the radar chaff for multipurpose countermeasures.

A dispersed cloud of quantum dots comprised of specific sizes and materials for given emission wavelength band and excited with radiation such as solar radiation has the ability to replicate the blackbody/spectral signature of any target via electronic emission. For example, the dispersed cloud of quantum dots is able to replicate the spectral signature or radiation signature profile of any asset over the entire. Visible, SWIR, MWIR and LWIR bands by using a composite mixture of dots comprised of InSb, HgSe, CdSe and PbTe materials with specific concentrations within the cloud.

A number of methods for producing quantum dots are known in the art. Any method of producing quantum dots which can emit in a desired range of wavelengths such as LWIR, MWIR and/or SWIR ranges, can be used herein. For example, colloidal methods can be used to synthesize quantum dots. The synthesis of colloidal quantum dots is based on a three component system composed of: precursors, organic surfactants, and solvents. When heating a reaction medium to a sufficiently high temperature, the precursors chemically transform into monomers. Once the monomers reach a high enough supersaturation level, the nanocrystal growth starts with a nucleation process. The temperature during the growth process is one of the factors in determining optimal conditions for the nanocrystal growth. The temperature is high enough to allow for rearrangement and annealing of atoms during the synthesis process while being low enough to promote crystal growth. Another factor that needs to be controlled during nanocrystal growth is the monomer concentration to achieve a homogenous quantum dot size.

In addition quantum dots can be encapsulated in a shell to achieve certain radiation emission characteristics. For example, in one embodiment, quantum dots can be produced according to a method disclosed in U.S. Pat. No. 6,322,901 to Bawendi et al., the entire contents of which are incorporated herein by reference. The U.S. Pat. No. 6,322,901 discloses a method of overcoating quantum dots composed of CdS, CdSe or CdTe with ZnS, ZnSe. In another embodiment, quantum dots can be fabricated according to a method disclosed in U.S. Pat. No. 6,344,272 to Oldenburg et al., the entire contents of which are also incorporated herein by reference. However, other methods can be employed to produce desired quantum dots according to the application sought.

Figure 8:
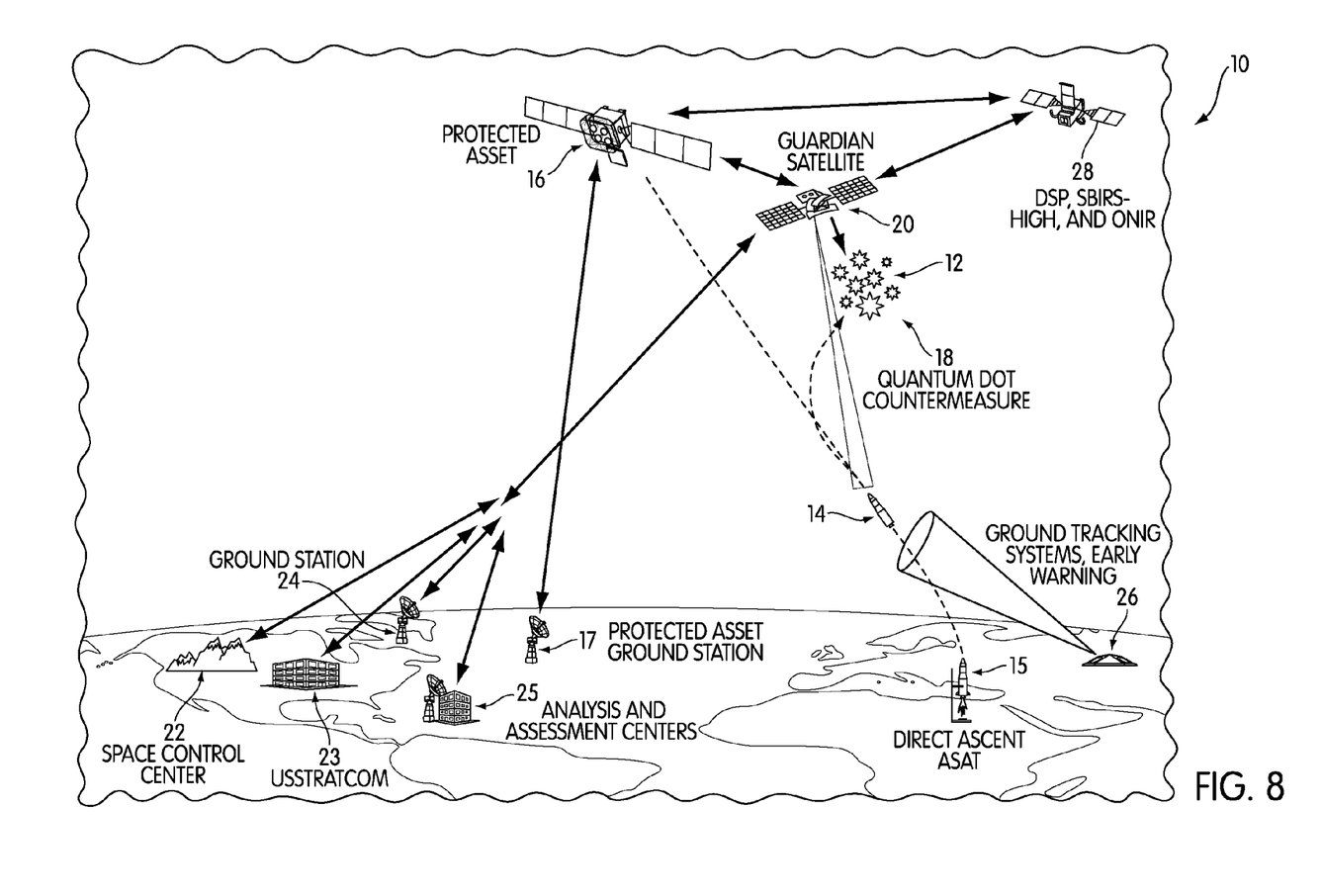
FIG. 8 shows schematically an operational diagram of a deployment of a countermeasure system, according to an embodiment of the present disclosure.

FIG. 8 shows schematically an operational diagram of a deployment of a countermeasure system, according to an embodiment of the present disclosure. The countermeasure system 10 includes utilizing one or more decoys 12 to trick the missile or anti-satellite weapon (ASAT) 14 targeting an asset (e.g., a satellite) 16 to seek the decoy 12 instead of the asset 16, as shown schematically by the dotted lines in FIG. 8. In one embodiment, the asset 16 can be, for example, a communication satellite or an imaging satellite in communication with ground station 17. In one embodiment, the decoy 12 comprises dispersed quantum dots 18. For example, in one embodiment, a payload of quantum dots 18 can be deployed on a relatively small satellite (e.g., a nano-satellite having a weight less than 100 kg) 20. The relatively small satellite 20 can be configured to be launched in a short period of time and can be configured to carry one or more payloads of quantum dots 18. The relatively small satellite 20 carrying the one or more payloads of quantum dots 18 plays the role of a guardian satellite to protect the asset 16 by releasing quantum dots 18 upon detection of an imminent attack by the missile 14 launched from a missile site 15 so as to trick the missile 14 to seek the decoy 12 instead of the asset 16.

In one embodiment, the guardian satellite 20 can be designed for deployment via a responsive space launch system, such as a Pegasus air-launch rocket into a leading co-orbit with the asset (e.g., satellite) 16 which it is intended to protect. The guardian satellite 20 can be manufactured to have any desired lifetime in orbit (e.g., between 1 year to 10 years). For example, for assets deemed of highest value, a higher reliability guardian satellite 20 can be designed with longer mission lifetime (up to 10 years). The higher reliability guardian satellite 20 can be upgraded or enhanced during the lifetime of the satellite with improved countermeasure systems.

In one embodiment, the guardian satellite 20 can be launched in co-orbit with the asset 16 it is intending to protect so as to lead the asset 16 by a certain distance (e.g., approximately 50 km) sufficient for the decoys 12 to direct the missile off course from its targeted asset 16. However, the distance should not be too large so that the quantum dots 18 released by the guardian satellite 20 be outside the focal plane's field of view of the missile 14 after launch of the missile 14 so that the missile 14 targets the decoys 12 (i.e., the dispersed cloud of quantum dots 18) instead of the asset 16.

A ground control station such as space control center 22, U.S. Strategic. Command (USSTRATCOM) 23, ground station 24 and/or analysis and assessment centers 25 can activate the satellite guardian 18 to release the quantum dots 18 upon receiving notice from ground tracking early warning systems 26 that the launch of an attack vector threat such as missile or ASAT 14 is detected.

The nano-satellite guardian 20 remains in hibernation mode from launch until activation by the ground control station 22, 23, 24 and/or 25. Since the exact orientation of the field of view of the missile 14 is unknown at the time of launch, the decoys 12 would need to be deployed in random radial directions from the guardian satellite 20 and with a velocity sufficient to put the decoys 12 a sufficient angular distance away from the asset 16 from the point of view of the missile (ASAT) 14, but not too large to be entirely out of field of view of the ASAT 14 during the acquire phase.

After the ASAT 14 completes its boost phase, approximately two minutes after launch, it will actuate its instrument cover and begin searching for its intended target, i.e., asset 16, by locking onto the signature (e.g., IR signature) of the asset 16. This is when the ASAT 14 is most vulnerable to countermeasure, since at this point the IR cross section of the targeted asset 16 against the backdrop of space is lowest and the ASAT 14 must also correct its course significantly (e.g., for a velocity vector deviation (ΔV) greater than 1%) to intersect with the projected orbital path of the asset 16. To maintain orientation, the guardian satellite 20 can be spin stabilized on orbit. In order to deploy the decoys 12, reaction control thrusters can place the guardian satellite 20 in a more rapid spin. In one embodiment, the guardian satellite 20 can, for example, use the centripetal force of its own spin to release the decoys 12 (e.g., the quantum dots 18) so as to evenly disperse the decoys 12 across the field of view of the ASAT 14. In one embodiment, the decoys can be released from the body of the guardian satellite 20 via electrical detachment, magnetic detachment or other types of detachment so as to the release of the decoys 12 can be timed to the missile 14 approach trajectory.

In one embodiment, a space-based missile plume sensing and early warning system 28 such as Space-Based Infrared System (SBIRS) and/or Observable Non-Imaging IR system (ONIR) can be provided. The space-based missile sensing and early warning system 28 can detect a plume of the missile 14 upon launch of the missile ASAT 14. Upon detection of the missile 14, the space-based missile plume sensing and early warning system 28 communicates with control ground station 22, 23, 24, and/or 25 to warn of the launch of the missile 14. The control ground station 22, 23, 24 and/or 25 assesses the threat and communicates with ground tracking systems 26 to inform the ground tracking systems 26 that the missile ASAT 14 was launched. The ground tracking systems 26 start tracking the missile. ASAT 14 and informs the control ground station 22, 23, 24, and/or 25 of the trajectory of the missile. ASAT 14. The control ground station 22, 23, 24 and/or 25 communicates with the guardian satellite 20 and activates the guardian satellite 20 to deploy the decoys 12 to protect the asset 16. Although the countermeasure system is described above using sensors, early warning systems and ground control station in a specific communication architecture, the countermeasure system is not limited to the above described communication architecture. In fact, the countermeasure system can be implemented in any architecture and using any specific sensors or warning systems.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

What we claim is:

1. A countermeasure system for protecting a satellite from a missile attack, the system comprising:
   a decoy comprising a plurality of quantum dots, the quantum dots being selected, responsive to excitation radiation, to emit radiation having an emission profile similar to a profile of a blackbody radiation signature of the satellite in space, the emitted radiation diverting the missile attack from the satellite onto the decoy.

2. The countermeasure system of claim 1, wherein the plurality of quantum dots emit in approximately a same wavelength range as the satellite.

3. The countermeasure system of claim 1, wherein an intensity profile of the radiation emitted by the quantum dots is essentially the same as an intensity profile of the radiation signature of the satellite.

4. The countermeasure system of claim 1, wherein the quantum dots are selected from the group consisting of InSb, PbTe, HgTe, CdTe, CdSe, CdS, and PbSnTe.

5. The countermeasure of claim 1, wherein the quantum dots have a size between about 2 nm and about 80 nm.

6. The countermeasure system of claim 1, wherein the plurality of quantum dots comprise quantum dots of various sizes.

7. The countermeasure system of claim 6, wherein a wavelength of a peak radiation emitted by a quantum dot increases with an increasing size of the quantum dot.

8. The countermeasure system of claim 1, wherein a characteristic wavelength of the quantum dots is tunable by selecting a size of the quantum dots.

9. The countermeasure system of claim 1, wherein the quantum dots are excited by radiation having a shorter wavelength than a wavelength of radiation emitted by the quantum dots.

10. The countermeasure system of claim 1, wherein the excitation radiation includes solar radiation, laser radiation, radiation emitted from a chemical exothermic reaction, or radiation emitted from an incandescent source, or any combination of two or more thereof.

11. The countermeasure system of claim 1, wherein the quantum dots are dispersed to form a cloud of quantum dots from a pack of quantum dots either suspended in an inert gas or sprayed from a reservoir into open space, or both.

12. The countermeasure system of claim 1, wherein the decoy further includes radar chaff.

13. The countermeasure system of claim 12, wherein the quantum dots are coated onto the radar chaff.

14. The countermeasure system of claim 1, wherein the quantum dots are carried by a guardian satellite in spatial co-orbit with the satellite.

15. The countermeasure system of claim 14, wherein the guardian satellite emits laser excitation radiation onto the quantum dots.

16. The countermeasure system of claim 1, wherein the quantum dots are dispersed to form a cloud within a field of view of a missile targeting the satellite.

17. A method of simulating a blackbody radiation signature of a satellite using quantum dots, the method comprising:
   dispersing quantum dots to form a cloud of quantum dots; and
   exciting the quantum dots with a first radiation so that the quantum dots emit a second radiation having a profile similar to the blackbody radiation signature profile of the satellite.

18. The method of claim 17, wherein the dispersing comprises dispersing the quantum dots within a field of view of a missile targeting the satellite.

19. The method of claim 17, wherein the exciting comprises exciting the quantum dots with solar radiation.

20. The method of claim 17, wherein the exciting comprises exciting the quantum dots with an artificial source of radiation.

21. A countermeasure system for protecting an asset from a missile attack, the system comprising:
 a decoy comprising a plurality of quantum dots,
 wherein the plurality of quantum dots comprise quantum dots of various sizes and quantum dots of different types of materials and the plurality of quantum dots are provided in selected ratios of different sizes of quantum dots and selected ratios of different types of materials, so that the plurality of quantum dots emit radiation having a radiation emission profile similar to a profile of a radiation signature of the satellite.

* * * * *